(12) United States Patent
Chen et al.

(10) Patent No.: US 7,761,404 B2
(45) Date of Patent: Jul. 20, 2010

(54) SYSTEM AND METHOD FOR MANAGING APPLICATION SPECIFIC PRIVILEGES IN A CONTENT MANAGEMENT SYSTEM

(75) Inventors: An Feng-I Chen, Fremont, CA (US); David Mun-Hien Choy, Los Altos, CA (US); Tawei Hu, San Jose, CA (US); Jy-Jine James Lin, Cupertino, CA (US); Kenneth Carlin Nelson, Hollister, CA (US); Yuping Wang, San Jose, CA (US); Alan Tsu-I Yaung, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1230 days.

(21) Appl. No.: 11/182,148

(22) Filed: Jul. 15, 2005

(65) Prior Publication Data

US 2005/0262551 A1 Nov. 24, 2005

Related U.S. Application Data

(63) Continuation of application No. 10/131,651, filed on Apr. 23, 2002, now Pat. No. 6,976,023.

(51) Int. Cl.
G06F 17/30 (2006.01)
(52) U.S. Cl. ...................................... 707/102
(58) Field of Classification Search ............... 707/8–10, 707/803; 709/203, 225, 226, 227, 231; 726/6, 726/8; 713/161, 183
See application file for complete search history.

(56) References Cited

U.S. PATENT DOCUMENTS 5,390,312 A   2/1995   Chiarot et al.
5,495,533 A   2/1996   Linehan et al.
5,504,892 A   4/1996   Atsatt et al.
5,552,776 A   9/1996   Wade et al.
5,560,005 A   9/1996   Hoover et al.

(Continued)

FOREIGN PATENT DOCUMENTS

WO   WO9940502   8/1999

OTHER PUBLICATIONS

Crall et al., *Authorization in Enterprise-wide Distributed System A Practical Design and Application*, Proceedings 14th Annual Computer Security Applications Conference. Los Alamitos, CA: IEEE Comput. Soc., 1998, 12 pages.

(Continued)

*Primary Examiner*—Diane Mizrahi
(74) *Attorney, Agent, or Firm*—Patterson & Sheridan, LLP

(57) ABSTRACT

Access to system and user defined entities (objects, data items, or the like) is managed by a content manager. A privilege grants a user an ability to access system such controlled entities. An item is an atomic user data entity stored in the CM library server. A privileges table is used to store system and user defined privileges. A privilege is represented by a row in the table. Each privilege has a unique privilege code, with codes 0 to 999 reserved to store system-defined privileges and codes beyond 999 open for user-defined privileges thus allowing application specific privileges to be added without limit.

9 Claims, 9 Drawing Sheets

| PRIVILEGES TABLE | | | |
|---|---|---|---|
| PRIVILEGE DEFINITION CODE | PRIVILEGE DEFINITION NAME | PRIVILEGE DEFINITION DESCRIPTION | |
| 40 ⋮ 119 | | (SYSTEM-DEFINED SYSTEM ADMINISTRATION PRIVILEGES) | 34 |
| 120 ⋮ 199 | | (SYSTEM DEFINED DATA ACCESS PRIVILEGES) | 36 |
| 1000 ⋮ | | (OPEN FOR USER-DEFINED PRIVILEGES) | 38 |

U.S. PATENT DOCUMENTS

| | | | |
|---|---|---|---|
| 5,627,987 | A | 5/1997 | Nozue et al. |
| 5,649,099 | A | 7/1997 | Theimer et al. |
| 5,701,458 | A | 12/1997 | Bsaibes et al. |
| 5,758,153 | A | 5/1998 | Atsatt et al. |
| 5,774,668 | A | 6/1998 | Choquier et al. ........ 395/200.53 |
| 5,778,222 | A | 7/1998 | Herrick et al. |
| 5,941,947 | A | 8/1999 | Brown et al. ................ 709/225 |
| 6,014,666 | A | 1/2000 | Helland et al. ................ 707/9 |
| 6,052,785 | A | 4/2000 | Lin et al. |
| 6,105,027 | A | 8/2000 | Schneider et al. |
| 6,141,754 | A | 10/2000 | Choy ......................... 713/200 |
| 6,161,139 | A * | 12/2000 | Win et al. ................... 709/225 |
| 6,195,705 | B1 | 2/2001 | Leung |
| 6,256,715 | B1 | 7/2001 | Hansen ....................... 711/163 |
| 6,308,173 | B1 | 10/2001 | Glasser et al. |
| 6,438,549 | B1 | 8/2002 | Aldred et al. |
| 6,460,141 | B1 | 10/2002 | Olden |
| 6,460,171 | B1 | 10/2002 | Couvert et al. |
| 6,470,353 | B1 | 10/2002 | Yaung et al. |
| 6,523,027 | B1 | 2/2003 | Underwood |
| 6,581,060 | B1 | 6/2003 | Choy |
| 6,609,128 | B1 | 8/2003 | Underwood |
| 6,633,878 | B1 | 10/2003 | Underwood |
| 6,718,535 | B1 | 4/2004 | Underwood |
| 6,772,350 | B1 | 8/2004 | Belani et al. |
| 6,823,338 | B1 | 11/2004 | Byrne et al. |
| 6,823,452 | B1 | 11/2004 | Doyle et al. |
| 6,976,023 | B2 | 12/2005 | Chen et al. |
| 7,016,907 | B2 | 3/2006 | Boreham et al. |
| 7,272,550 | B2 * | 9/2007 | Chen et al. .................... 703/27 |
| 7,284,265 | B2 | 10/2007 | Choy et al. |
| 7,308,580 | B2 * | 12/2007 | Nelson et al. ............... 713/183 |
| 2001/0037379 | A1 | 11/2001 | Livnat |
| 2002/0002577 | A1 | 1/2002 | Garg et al. |
| 2003/0200466 | A1 * | 10/2003 | Nelson et al. ............... 713/202 |

OTHER PUBLICATIONS

Takahashi et al., *A Mobile Agent for Asynchronous Administration of Multiple DBMS Servers*, Proceedings of the IEEE Third International Workshop on Systems Management. Los Alamitos, CA: IEEE Comput. Soc., 1998, pp. 1-2.

IBM Corp. *IBM Content Manager for Multiplatforms System Administration Guide*, Version 7.1. First Edition (Jan. 2001) [accessed Mar. 27, 2002 2:26 pm http://ww-4.ibm.com/software/data/cm/pubs/cm71/sysadm/frns2mst.html].

Hayton et al., *An Open Architecture for Secure Interworking Services*, Proceedings of the 17th International Conference on Distributed Computing Systems. Los Alamitos, CA: IEEE Comput. Socl. Press, 1997. pp. 315-321.

Han et al., *Constraint Specification for Object Model of Access Control Based on Role*. Software Engineering Notes., vol. 25, No. 2, Mar. 2000. USA: ACM. pp. 60-64 [Inspec Abstract AN 6580279, ABN C2000-06-6130S-023].

Thesaurus.com, Refresh (Synonyms), pp. 1-4, URL:http://thesaurus.reference.com/browse/refresh, retrieved online Jul. 27, 2006.

Dictionary.com, Refresh (Definition), pp. 1-3, URL:http://dictionary.reference.com/browse/refresh, retrieved online Jul. 27, 2006.

Dictionary.com, Update (Definition), pp. 1-2, URL:http://dictionary.reference.com/browse/update, retrieved online Jul. 27, 2006.

Dictionary.com, Incremental (Definition), pp. 1-2, URL:http://dictionary.reference.com/browse/incremental, retrieved online Jul. 27, 2006.

Sandhu et al. 'NetWare 4 as an Example of Role-Based Access Control'. ACM Press, 1996. 12 pages.

System and Method for RDBMS to Protect Records in Accordance with Non-RDBMS Rules. IBM U.S. Appl. No. 09/598,553 filed Jun. 21, 2000.

Swift et al. 'Improving the Granularity of Access Control in Windows NT.' ACM Workshop on Role Based Access Control. pp. 87-96. May 2001.

H.M. Gladney. "Access Control for Large Collections." ACM Transactions on Information Systems, vol. 15, No. 2. Apr. 1997, pp. 154-157.

Abadi et al. 'A Calculus for Access Control in Distributed Systems.' ACM Transactions on Programming Languages and Systems, vol. 15, No. 4, Sep. 1993, pp. 706-734.

Chan et al, "Incremental Update to Aggregated Information for Data Warehouses over Internet", Proceedings of the 3rd ACM international workshop on Data warehousing and OLAP, 2000, pp. 57-64.

Office Action History of U.S. Appl. No. No. 10/131,651, Apr. 23, 2002.

Office Action History of U.S. Appl. No. 10/131,008, Apr. 23, 2002.

Office Action History of U.S. Appl. No. 11/975,579, Apr. 23, 2002.

Office Action History of U.S. Appl. No. 10/131,634, Apr. 23, 2002.

Office Action History of U.S. Appl. No. 10/131,659, Apr. 23, 2002.

IBM Corp. Content Manager for Multiplatforms. Wysiwyg://2/http://www-4.ibm.com/software/data/cnn/cmgr/mp/about html; and Wysiwyg://1/http://www-4.ibm.com/software/data/cm/cmgr/mp [accessed Mar. 26, 2002 5:13 PM].

Tatsuaki Okamoto. A Single Public-Key Authentication Scheme for Multiple Users. Systems and Computer in Japan, vol. 18, No. 10, pp. 14-24, Oct., 1987.

Dictionary.com, Retrieved online http//dictionary.reference.com/search?q=compile Compile, definition of. [Mar. 30, 2006].

* cited by examiner

| SYSTEM CONTROL TABLE | | | | | |
|---|---|---|---|---|---|
| DATABASE NAME | ACL BINDING LEVEL | LIBRARY ACL CODE | PUBLIC ACCESS ENABLED | ALLOW TRUSTED LOGON | |
| 102 | 104 | 106 | 108 | 105 | |

| USERS TABLE | | | | | | |
|---|---|---|---|---|---|---|
| USER ID | USER KIND | USER PRIVILEGE SET CODE | GRANT PRIVILEGE SET CODE | DEFAULT ACL CODE | PASSWORD | USER NAME |
| 130 | 140 | 142 | 146 | 148 | 156 | 152 |

| USER GROUP TABLE /18 |||
|---|---|---|
| USER ID | GROUP USER ID | |
| ↖130 | ↖132 | |

FIG. 5

| ACCESS CODES TABLE /43 ||
|---|---|
| ACL CODE | |
| ↖134 | |

| ACCESS CONTROL LIST (ACL) TABLE /44 |||||
|---|---|---|---|---|
| USER KIND | USER/ GROUP ID | ACL CODE | PRIVILEGE SET CODE | |
| ↖140 | ↖142 | ↖134 | ↖154 | |

FIG. 7

| PRIVILEGES TABLE | | | |
|---|---|---|---|
| PRIVILEGE DEFINITION CODE | PRIVILEGE DEFINITION NAME | PRIVILEGE DEFINITION DESCRIPTION | |
| 40 ⋮ 119 | | (SYSTEM-DEFINED SYSTEM ADMINISTRATION PRIVILEGES) | |
| 120 ⋮ 199 | | (SYSTEM DEFINED DATA ACCESS PRIVILEGES) | |
| 1000 ⋮ | | (OPEN FOR USER-DEFINED PRIVILEGES) | |

FIG. 12

SYSTEM AND METHOD FOR MANAGING APPLICATION SPECIFIC PRIVILEGES IN A CONTENT MANAGEMENT SYSTEM

CROSS REFERENCES TO RELATED APPLICATIONS

The present application is a continuation of U.S. application Ser. No. 10/131,651 filed Apr. 23, 2002, now U.S. Pat. No. 6,976,023 entitled "SYSTEM AND METHOD FOR MANAGING APPLICATION SPECIFIC PRIVILEGES IN A CONTENT MANAGEMENT SYSTEM.

BACKGROUND OF THE INVENTION

U.S. patent application Ser. No. 10/131,008, entitled "SYSTEM AND METHOD FOR ENSURING SECURITY WITH MULTIPLE AUTHENTICATION SCHEMES", Ser. No. 10/131,634, entitled "SYSTEM AND METHOD FOR CONFIGURABLE BINDING OF ACCESS CONTROL LISTS IN A CONTENT MANAGEMENT SYSTEM", and Ser. No. 10/131,659, entitled "SYSTEM AND METHOD FOR INCREMENTAL REFRESH OF A COMPILED ACCESS CONTROL TABLE IN A CONTENT MANAGEMENT SYSTEM" filed concurrently herewith are assigned to the same assignee hereof and contain subject matter related, in certain respect, to the subject matter of the present application. The above-identified patent applications are incorporated herein by reference.

1. Technical Field of the Invention

This invention relates a system and method for managing a database. More particularly, it relates to a system and method for managing application specific privileges in a content management system.

2. Background Art

IBM Content Manager Version 7 (CM V7) provides a limited support for application specific privileges. Its design allows up to 99 bits in a 400-bit privilege string for applications. With 99 bits for application specific privileges, it is difficult to accommodate the growing needs for security control of sophisticated business applications. This deficiency reduces the expandability of the security model of CM V7.

CM V7 uses a 50-byte fixed vector to store 400 privilege bits. The last 99 bits are reserved for application specific privileges. The fixed vector causes the deficiency of adding additional application specific privileges into the system.

It is an object of the invention to provide an improved system and method for managing application specific privileges.

SUMMARY OF THE INVENTION

System and method for managing privileges by storing system defined and user defined privilege definition codes in a database table, with a first plurality of the codes reserved to system defined privilege definition codes, and codes beyond the first plurality reserved to user defined privilege definition codes; and executing a database stored procedure selectively for adding, updating and deleting a user defined privilege.

In accordance with an aspect of the invention, there is provided a computer program product configured to be operable to manage application specific privileges in a content management system.

Other features and advantages of this invention will become apparent from the following detailed description of the presently preferred embodiment of the invention, taken in conjunction with the accompanying drawings.

BRIEF DESCRIPTION OF THE DRAWINGS

FIG. 3 illustrates the system control table 31 of FIG. 2.

FIG. 4 illustrates the user table 16 of FIG. 2.

FIG. 5 illustrates the user group table 18 of FIG. 2.

FIG. 6 illustrates the access codes table of FIG. 2.

FIG. 7 illustrates the access control list (ACL) table 44 of FIGS. 1 and 2.

FIG. 12 illustrates the assignment of privilege definition codes in privileges table 32.

DETAILED DESCRIPTION OF PREFERRED EMBODIMENTS

In accordance with the preferred embodiment of the invention, a system and method is provided for managing application specific privileges in a content management system.

Figure 1:
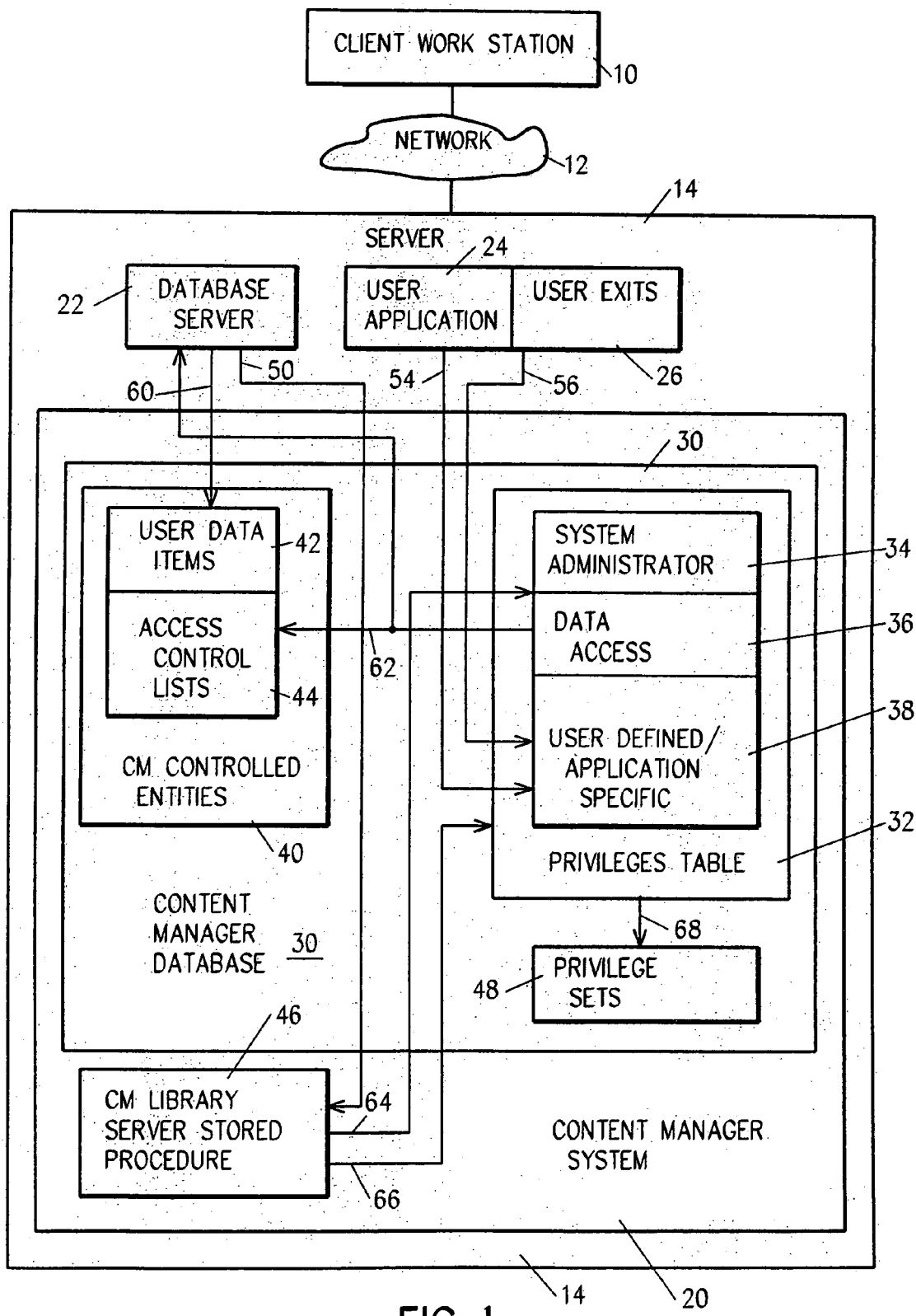
FIG. 1 is a high level diagram illustrating basic components of a preferred embodiment of the system of the invention for managing user defined, application specific privileges in a content management system.

Referring to FIG. 1, in an exemplary embodiment of the system of the invention, a user at a client workstation 10 is connected through network 12 to a server 14 which includes a content manager system 20, a database server 22, user applications 24 and exits 26. Content manager system 20 includes content manager database 30 and stored procedures 46, which procedures 46, among other things, define the methods and tasks executed by content manager system 20 with respect to the tables of database 30. System database 30 includes content manager controlled entities 40, a privileges table 32, privileges sets 48, and several other tables including those shown in FIG. 2.

Figure 2:
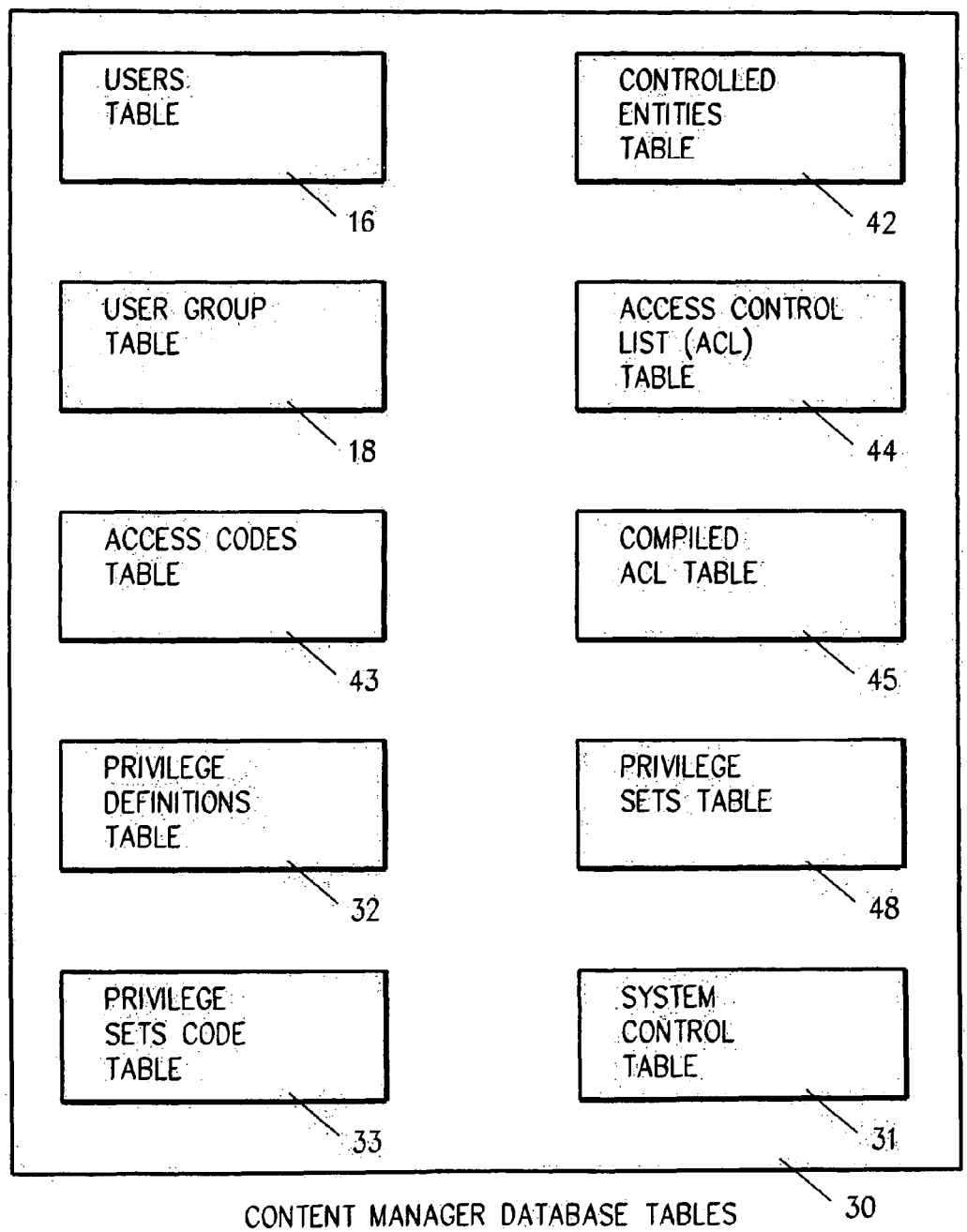
FIG. 2 is a high level diagram illustrating various tables for implementing a preferred embodiment of the system of the invention.

Referring to FIG. 2, access to entity 42 is managed through the use of several tables, including in this preferred embodiment of the invention users table 16, user groups table 18, access codes table 43, system control table 31, privilege definitions table 32, privilege sets code table 33, access control list (ACL) table 44, compiled ACL table 45, and privilege sets table 48.

Referring to FIG. 3, system control table 31 stores system configuration parameters for CM library server 20. Columns of table 31 include database name 102, ACL binding level 104, library ACL code 106, and public access enabled flag 108. Database name 102, an installation parameter, is the name of the library server 22. ACL binding level 104 is the access control level having, as valid values, 0 at item type level (default), 1 at item level, 2 at mixed item and item type level, and 3 at entire library level. Library ACL code 106 contains the ACL to be associated with all CM item types and items 40 if the parameter ACL binding level 104 is configured at library/level. Public access enabled flag 108 indicates whether the capability of opening a bound entity public to public is enabled. When this column 108 is updated, system 20 rebuilds compiled ACL tables 45 and recreates all database table 30 views.

Referring to FIG. 4, users table 16 maintains a catalog of individual users and user groups 141. Individual users 141 can belong to none or any number of groups. Users must be assigned a number of privileges, stored in user privilege set code table 33. The system administrator ensures the usefulness of the CM users 141 he creates. A group is a number of zero or more users 141, usually with the same job description, and assigned the same privilege set 158. A group 136 cannot belong to other groups. A group 136 does not hold default privileges for its members, nor do they relate to data base management system (DBMS) or operating system groups. Defining groups 136 minimizes the effort required to administer ACLs 143.

User table 16 columns include user ID 130, user kind 140, user privilege set code 142, grant privilege set code 146, default ACL code 148, password 156, and user name 152. User ID 130 is the ID of the individual user or group. For an individual user 141, user ID 130 should match his DBMS user ID. The CM 20 uses this value for user authentication and access control. For a group 141, user ID 130 contains the group name. User kind 140 indicates whether this entry 141 represents an individual user or a group. User privilege set code 142 denotes the user privileges for this user 141. The privilege set 158 must be defined first, and this value is not valid for groups. It is set to 1 by CM system 20 for groups. User privilege set code 142 may be updated. Grant privilege set code 146 is the code assigned to new users 141 by a user 141 who is authorized to create users but not grant privileges to the new users. This value 146 is not valid for groups, and it can be updated. A system administrator GUI for creating a user 141 must have an entry field for that user's grant privilege set code 146. Default ACL code 148 is used to associate with items 42 when the access control 104 is configured at item level if this user 141 does not provide an ACL code when he creates items 42. Password 156 is the encrypted user password. User name 152 is the full name of this user or group 141.

Referring to FIG. 5, users group table 18 maintains associations of individual users 141 with groups 136. The columns of table 18 are user ID 130 and group user ID 132. An individual user 141 can belong to none or any number of groups 141. A group 141 cannot belong to other groups. When an individual user 141 is associated with a group 141, the user is said to be a member of that group. Associating individual users with groups in user group table 18 by a row 136 having a user ID 130 associated with a group ID 132 simplifies access control management. When defining access control specifications 143, a group 141 can be granted a number of privileges instead of granting the same set of privileges 158 to each user 141 in the group. The individual user 141 and the group 141 must be defined in the users table 16 before an association in user group table 18 can be made between the user ID 130 and the group ID 132. Rows in this table can only be deleted, not updated.

Referring to FIG. 6, access codes table 43 maintains the access control list identifiers 134. Each list 143 is uniquely identified by the access list code 134 which is generated by CM system and cannot be updated. The list specifications are stored in the access control list table 44. ACL name and description are defined in a separate keywords table (not shown). Table I sets forth an exemplary list of pre-configured ACL codes 134.

TABLE I

CM Pre-configured ACL Codes

| ACLCode 134 | ACLName* | ACLDesc* |
|---|---|---|
| 1 | SuperUserACL | ACL allows CM pre-configured user ICMADMIN to perform all CM functions on the bound entities 40. |
| 2 | NoAccessACL | ACL specifies, for all CM users, no actions are allowed on the bound entities 40. |
| 3 | PublicReadACL | ACL allows all CM users to read the bound entities 40. |

*For illustration only. Name and description are defined in a keywords table (not shown).

Referring to FIG. 7, access control list (ACL) table 44 maintains the access control list specifications. The columns of table 44 include user kind 140, user/group ID 142, ACL code 134, and privilege set code 154. ACL code 134 is the ID of an access control list. Access control lists are used by the access control algorithm to determine a user's access rights for an item 44. User ID 142 contains the ID 130 for an individual user 141 or for a group 141. User kind 140 interprets the User ID column 130 as public, group, or individual. If user kind 140 is public, the value in user ID column 130 is ignored. Privilege set code 154 is the Privilege Set 158 identifier, which indicates the operations allowed for the bound item 42. A list may contain more than one control 143, and comprises all rows 143 having the same ACL code 134. Each control 143 is composed of two elements: who (user ID 142, user kind 140) can perform what (privilege set code 154). Each CM data entity (Item) 42 must be bound to a control list in table 44. The control specifications 143 then will be enforced when items 42 are accessed. Table II is an exemplary list of pre-configured access control lists.

TABLE II

Pre-configured Access Control Lists

| ACLCode 134 | UserID 142 | UserKind 140 | PrivSetCode 154 |
|---|---|---|---|
| 1 (SuperUserACL) | ICMADMIN | 0 | 1 (AllPrivSet) |
| 3 (PublicReadACL) | ICMPUBLC | 2 (public) | 6 (ItemReadPrivSet) |

Figure 8:
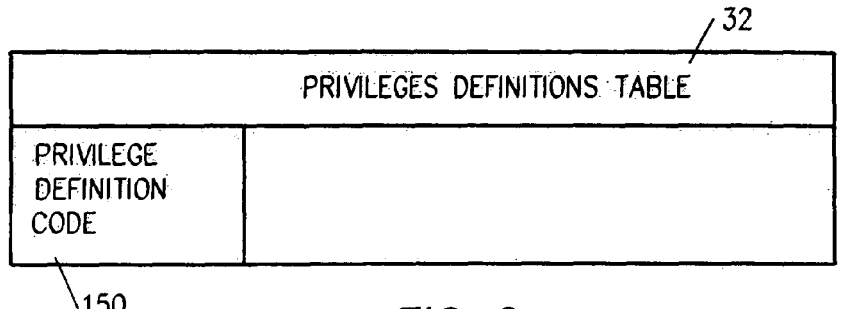
FIG. 8 illustrates the privileges definitions table of FIG. 2.

Referring to FIG. 8, privileges definitions table 32 maintains an unlimited number of CM privilege definitions, including both CM system defined privilege definitions 34, 36 and user defined privileges 38. System defined privileges 34, 36 cannot be modified. Each privilege has a system 20 generated unique privilege definition code 150 as a primary key. Codes 0 to 999 are reserved to store CM system 20 defined privileges 34, 36. 1000 and up are open for user defined privileges 38. When defining or updating privilege sets 48, this table 32 can be first queried to list all defined privileges 34-38. Applications 24 can also query this table 32 at runtime to get the definitions of the connected user's privileges and customize the application menu selections specifically suitable for that user (at client workstation 10). Privilege name and description are defined in a keywords table (not shown). Table III provides a exemplary set of system defined system administrator privilege definitions 34 and data access privilege definitions 36, showing privilege definition code 150 and corresponding example privilege definition names and privilege definition descriptions.

TABLE III

System Defined Privilege Definitions

| Priv Def Code 150 | PrivDefName* | PrivDefDesc* |
|---|---|---|
| | | Sys Admin 34 |
| 40 | SystemAdmin | The CM system administration privilege. |
| 41 | SystemQuery | The privilege to query CM system information. |
| 42 | SystemDefineUser | The privilege to create and update users. |
| 43 | SystemQueryUserPriv | The privilege to query other user's privileges. |
| 44 | SystemGrantUserPriv | The privilege to grant other user's privileges. |
| 45 | SystemDefineItemType | The privilege to query, create, update and delete Item Types and Attributes. |
| | | Data Access 36 |
| 120 | ItemSuperAccess | The privilege to bypass ACL check. |
| 121 | ItemSQLSelect | The privilege to select Items using SQL interface. |
| 122 | ItemTypeQuery | The privilege to query Item Type and Attribute definitions. |
| 123 | ItemQuery | The privilege to query Items. |
| 124 | ItemAdd | The privilege to create Items. |
| 125 | ItemSetUserAttr | The privilege to update Item's user-defined attribute values. |
| 126 | ItemSetSysAttr | The privilege to update Item's system-defined attribute values. |
| 127 | ItemDelete | The privilege to delete Items. |
| 128 | ItemMove | The privilege to move Items between Item Types. |
| 129 | ItemLinkTo | The privilege to heterogeneously link Items to other Items (make the Items foreign key children). |
| 130 | ItemLinked | The privilege to set Items to be heterogeneously linked by other Items (make the Items foreign key parents). |
| 131 | ItemOwn | The privilege to set Items to own a collection of Items. |
| 132 | ItemOwned | The privilege to set Items to be owned by other Items. |

*For illustration only. Name and description are defined in an NLS Keywords table (not shown).

Figure 9:
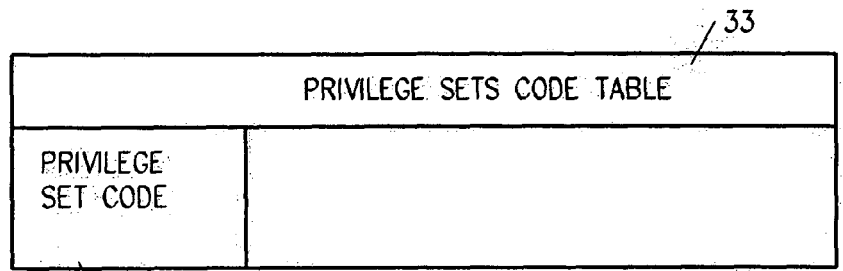
FIG. 9 illustrates the privilege sets code table 33 of FIG. 2.

Referring to FIG. 9, privilege sets code table 33 maintains privilege set definitions. A privilege set comprises an unlimited number of privileges. Each set is uniquely identified by a CM system 20 generated code, privilege set code 154. Its set member associations are stored in privilege sets table 48. Privilege set name and description are defined in a keywords table (not shown). Table IV gives an exemplary set of pre-configured privilege set codes 154 together with privilege sets names and descriptions.

TABLE IV

CM Pre-configured Privilege Set Codes

| Priv Set Code 154 | PrivSetName* | PrivSetDesc* |
|---|---|---|
| 1 | AllPrivSet | Users with this Privilege Set can perform all CM functions on all CM library entities 40. |
| 2 | NoPrivSet | Users with this Privilege Set cannot perform any CM functions on any CM library entities 40. |
| 3 | SystemAdminPrivSet | Users with this Privilege Set can perform all CM system administration and data modeling functions. |
| 4 | ItemAdminPrivSet | Users with this Privilege Set can perform all CM data modeling and Item 42 access functions. |
| 5 | ItemLoadPrivSet | Users with this Privilege Set can load Items 42 into CM library 40. |
| 6 | ItemReadPrivSet | Users with this Privilege Set can search and view CM Items 44. |
| 7 | ICMConnectPrivSet | Users with this privilege set can logon with a different UserID than the one used to Connect (Connect or database 30 UserID 130). |

*For illustration only. Name and description are defined in a keywords table (not shown).

Figure 10:
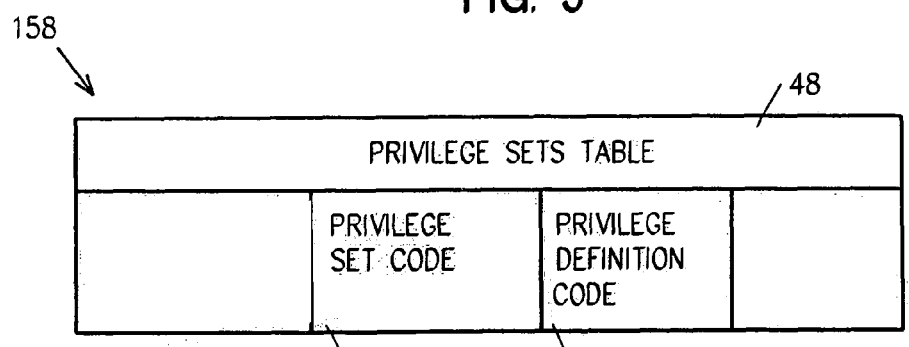
FIG. 10 illustrates the privilege sets table 48 of FIGS. 1 and 2.

Referring to FIG. 10, privilege sets table 48 maintains associations of CM privileges with the privilege sets. Rows 158 with the same privilege set code 154 form a privilege set. Rows 158 in this table 48 can only be deleted, not updated. Columns in privilege sets table 48 include privilege set code 154 and privilege definition code 150. Table V sets forth a collection of exemplary pre-configured privilege sets.

TABLE V

Pre-configured Privilege Sets

| Priv Set Code 154 | Priv Def Code 150 | PrivSetName* | PrivDefName* |
|---|---|---|---|
| 1 | 40 | AllPrivSet | SystemAdmin |
| 1 | 41 | | SystemQuery |
| 1 | 42 | | SystemDefineUser |
| 1 | 43 | | SystemQueryUserPriv |
| 1 | 44 | | SystemGrantUserPriv |
| 1 | 45 | | SystemDefineItemType |
| 1 | 120 | | ItemSuperAccess |
| 1 | 121 | | ItemSQLSelect |
| 1 | 122 | | ItemTypeQuery |
| 1 | 123 | | ItemQuery |
| 1 | 124 | | ItemAdd |
| 1 | 125 | | ItemSetUserAttr |
| 1 | 126 | | ItemSetSysAttr |
| 1 | 127 | | ItemDelete |
| 1 | 128 | | ItemMove |
| 1 | 129 | | ItemLinkTo |
| 1 | 130 | | ItemLinked |
| 1 | 131 | | ItemOwn |
| 1 | 132 | | ItemOwned |
| 3 | 40 | SystemAdminPrivSet | SystemAdmin |
| 3 | 45 | | SystemDefineItemType |
| 4 | 45 | ItemAdminPrivSet | SystemDefineItemType |
| 4 | 121 | | ItemSQLSelect |
| 4 | 122 | | ItemTypeQuery |
| 4 | 123 | | ItemQuery |
| 4 | 124 | | ItemAdd |
| 4 | 125 | | ItemSetUserAttr |
| 4 | 126 | | ItemSetSysAttr |
| 4 | 127 | | ItemDelete |
| 4 | 128 | | ItemMove |
| 4 | 129 | | ItemLinkTo |
| 4 | 130 | | ItemLinked |
| 4 | 131 | | ItemOwn |
| 4 | 132 | | ItemOwned |
| 5 | 124 | ItemLoadPrivSet | ItemAdd |
| 5 | 128 | | ItemMove |
| 5 | 130 | | ItemLinked |
| 5 | 132 | | ItemOwned |
| 6 | 121 | ItemReadPrivSet | ItemSQLSelect |
| 6 | 123 | | ItemQuery |
| 7 | 1 | ICMConnectPrivSet | AllowConnectToLogon |

*For illustration only. Name and description are defined in the NLS Keywords table.

Figure 11:
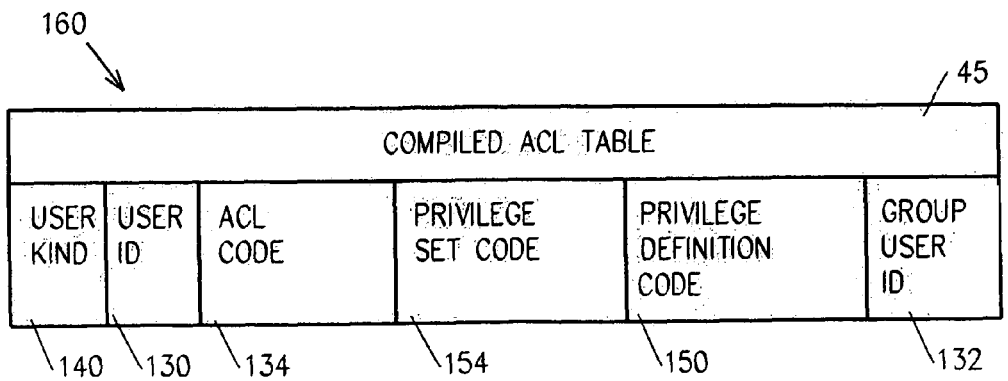
FIG. 11 illustrates the compiled ACL table 45 of FIG. 2.

Referring to FIG. 11, compiled ACL table 45 contains the compiled access control information. Columns in table 45 include user kind 140, user ID 130, ACL code 134, privilege set code 154, privilege definition code 150, and group user ID 132. User ID 130 contains only individual users. For each row 160 in compiled ACL table 45, privilege definition code 150 represents a single privilege for access to item 42. ACL code 134 is the access control list code. Privilege definition code 150 indicates the operation allowed for bound item 42. Privilege set code 154 is the privilege set code that the resolved privilege is derived from. This is a maintenance field, designed for incremental refresh on this table. For example, when a privilege set 158 is modified, rows 160 with the corresponding privilege set code 154 are affected, while other rows 160 are not. User ID 130 contains the authorized user's User ID. Group user ID 132 contains the group's User ID if this entry 160 is derived from an ACL rule for group. This column 132 provides a maintenance field, designed for incremental refresh. It contains null if the ACL rule user kind 140 is not for group. User kind 140 indicates which ACL rule type this row 160 is derived from: public, group or individual user.

Managing Application Specific Privileges

User refers to a registered CM 20 user that can obtain CM services. A user-defined privilege is a CM user-defined application-specific privilege. A user ID is a unique name for a CM user and is used for runtime authentication and access control. User Privileges are a number of privileges granted to each CM User, stored in user's profile. User privileges define the maximum operations a user can perform. A user's effective access rights will never exceed his user privileges.

A Privilege represents an ability to use the CM system. Privileges are be grouped into privilege sets 158 before they can be used. Privilege definition code 150 is a CM system generated unique identifier for each CM Privilege 158. A privilege set 158 is a named group of privileges and is used for both defining ACLs and granting privileges to users. A Privilege set code 154 is a CM-system-generated unique identifier for each CM privilege set. User privileges granting and ACL defining are carried out using this code. A system defined privilege 34, 36 is a CM-system-defined privilege definition. System entities are CM system 20 management entities which can be system tables, views, indexes and stored procedures. A system entity has no ACL 44 associated with it and access to system entities is authorized only by user privileges 32.

Privileges table 32 is used to store system and user defined privileges. A privilege is represented by a row in the table. A new privilege can be added into table 32 by inserting a new row for the privilege. A privilege can be removed by deleting the corresponding row from table 32. Each privilege has a unique privilege code 150. Codes 0 to 999 are reserved to store CM system-defined privileges 36, 38. 1000 and up are open for user-defined privileges 38. Application specific privileges 38 can be added without limit.

A privilege is an ability to use CM system 20, a function of which is to manage and control access to system and user defined objects, or data items. An item is an atomic user data entity stored in the CM library server. An item type is a schema definition for a collection of items and is also used to represent all items that conform to the same schema definition. For example, as is represented by line 70, the ability to search CM items 40 is ItemQuery, and the ability to delete CM items is ItemDelete. CM Privileges 34, 36, 38 are used to grant access to data items 42 to individual users and to define ACLs 44. An access control list (ACL) 44 is a set of one or more access control rules used to control access to CM controlled entities 40. A rule specifies who (users/groups/public) can perform what functions (ACL privileges) 32. A group is a number of zero or more users and is used only for defining ACLs, not for granting privileges. ACL privileges are operations specified in an ACL rule that are allowed to be applied on a bound controlled entity 40 by the ACL-specified users. A Controlled entity 40 is a unit of protected user data 42, and can be an item, an item type or the entire library. Library refers to the entire collection of user data 42 stored in the CM system. A controlled entity 40 must be bound to an ACL 44. Access to a Controlled Entity 40 is authorized by both user privileges 32 and ACL 44. An ACL rule for group is an ACL rule that is pertinent to a group. An ACL rule for public is an ACL rule that is pertinent to all users. An ACL rule for user is an ACL rule that is pertinent to an individual user. Rules with the same ACL code 134 form an ACL 44. An ACL code 134 is a CM system 20 generated unique identifier for an ACL 44. The CM controlled entity 40 ACL 44 binding is carried out using this code 134. As is represented by line 58, CM privileges 34, 36, 38 are grouped into privilege sets 48 before they are used. As is represented by line 62, data access privileges 36 control access to user data items 42 via access control lists 44 or directly by a SQL interface in database server 22 without checking access control list 44.

CM system 20 provides a number of un-modifiable predefined privileges, called system-defined privileges 34, 36. Each of these privileges authorizes a certain operation(s). As is represented by line 64, system-defined privileges 34, 36 are enforced by CM library server 20 stored procedures 46.

CM system 20 also allows users to define their application-specific privileges, called user-defined privileges 38. As is represented by line 56, user-defined privileges 38 are enforced by user application 24 through user exits 26.

Each privilege 32 has a system-generated unique privilege Definition Code 150. Privilege Definition Codes 150 from 0 to 999 are reserved to store CM system-defined privileges 34, 36. Codes 150 from 1000 and up are open for User-defined Privileges 38. All the privilege definitions including user-defined privileges 38 are stored in the CM system table ICM-STPrivDefs 32.

CM System Administration Privileges

CM System Administration Privileges 34 contain the rights to model user data and administer and maintain the CM system 20. This category does not include any access rights to the user data 42. The CM system 20 management tasks may include:
- configure the CM system,
- manage security policies, including user profiles,
- manage Library Server configurations,
- manage resource manager definitions,
- manage extended search service definitions,
- manage workflow service definitions,
- manage Item Types,
- manage Item Attributes,
- manage data format (content type),
- manage Item semantic types,
- etc.

Privileges 34 defined in this category are:

SystemAdmin—The CM system administration privilege. It conveys the right to manage the system. It is the highest CM System 20 Administration Privilege 34 and allows user to perform all management tasks (aka functions). In an exemplary embodiment, a user with this privilege requires DB2 DBADM authority.

SystemQuery—The privilege to query CM system information.

SystemDefineUser—The privilege to create and update, but not delete CM users.

SystemQueryUserPriv—The privilege to query other user's User Privileges 32.

SystemGrantUserPriv—The privilege to grant other user's User Privileges 32.

SystemDefineItemType—The privilege to query, create, update and delete Item 42 Types and Attributes. In an exemplary embodiment, a user with this privilege requires one of the following DB2 authority lists: DBADM or database CREATETAB, BINDADD, schema CREATEIN, ALTERIN, DROPIN.

Data Access Privileges

Data access privileges 36 specify rights to access and modify the CM Controlled Entities 40. Entities 40 include documents, files, folders, etc. Access to Controlled Entities 40, in addition to access control list (ACL) 44 check, is controlled by this category of privileges 36.

The following is an exemplary list of data access privileges 36.

ItemSuperAccess—This super access privilege allows bypassing ACL 44 check and therefore enables the privileged operation to be applied to all data 42. It is designed mainly for defining super users so that they can perform any operations on any system data and user data 42.

ItemSQLSelect—The privilege to select items 40 using SQL interface 28.

ItemTypeQuery—The privilege to query item type and attribute definitions.

ItemQuery—The privilege to query items 40.

ItemAdd—The privilege to create items 40.

ItemSetUserAttr—The privilege to update an item's user-defined attribute values (implicit checkout/checkin).

ItemSetSysAttr—The privilege to update an item's 40 system-defined attribute values (implicit checkout/checkin).

ItemDelete—The privilege to delete items 40 (implicitly checks whether item has been checked out).

ItemMove—The privilege to move items 42 between item Types.

ItemLinkTo—The privilege to heterogeneously link items 42 to other items.

ItemLinked—The privilege to set items 42 to be heterogeneously linked by other items.

ItemOwn—The privilege to set items 42 to own a collection of Items.

ItemOwned—The privilege to set items 42 to be owned by other Items.

ItemAddLink—The privilege to create a link or a set of links between two items 42.

ItemChangeLink—The privilege to modify previously defined links between items.

ItemRemoveLink—The privilege to delete previously defined links between items.

ItemCheckOut—The privilege to check out an item 42. This implies the privilege to check in items as well.

In connection with FIG. 12, the layout of privilege definitions is described in Table VI.

TABLE VI

PRIVILEGE DEFINITION LAYOUT

| Privilege Definition Code From | Privilege Definition Code To | Category |
| --- | --- | --- |
| 0 | 39 | Reserved for System-defined Privileges |
| 40 | 119 | System Administration Privileges |
| 120 | 199 | Data Access Privileges |
| 200 | 999 | Reserved for System-defined Privileges |
| 1000 | . . . | Open for User-defined Privileges |

Privilege Definition Table

Privilege definition table 32 maintains the unlimited number of CM privilege definitions, including both CM system defined privileges 34, 36 and user-defined privileges 38. None of the system defined privileges can be modified. Each privilege has a system-generated unique code 150. Codes 0 to 999 are reserved to store CM System-defined Privileges 34, 36. Codes beyond 999, that is, 1000 and up, (or, conceivably, 0 and down) are open for user-defined privileges 38. When defining or updating privilege sets 48, this table 32 can be first queried to list all defined privileges. As is represented by line 56, applications 24 can also query this table 32 at runtime to get the definitions of the connected user's 10 privileges and customize the application 24 menu selections specifically suitable for that user 10.

Table VII shows the definitions of CM system-defined privileges 34, 36 in the privilege definition table 32. Each row contains a privilege definition code (PrivDefCode) 150, a privilege definition name (PivDefName) 74, and the description (PrivDefDesc) 76.

TABLE VII

CM SYSTEM-DEFINED PRIVILEGE DEFINITIONS

| PrivDefCode 150 | PrivDefName 74 | PrivDefDesc 76 |
|---|---|---|
| System Administration Privileges 34 | | |
| 40 | SystemAdmin | The CM system administration privilege. |
| 41 | SystemQuery | The privilege to query CM system information. |
| 42 | SystemDefineUser | The privilege to create and update users. |
| 43 | SystemQueryUserPriv | The privilege to query other user's privileges. |
| 44 | SystemGrantUserPriv | The privilege to grant other user's privileges. |
| 45 | SystemDefineItemType | The privilege to query, create, update and delete Item Types and Attributes. |
| Data Access Privileges 36 | | |
| 120 | ItemSuperAccess | The privilege to bypass ACL check. |
| 121 | ItemSQLSelect | The privilege to select Items using SQL interface. |
| 122 | ItemTypeQuery | The privilege to query Item Type and Attribute definitions. |
| 123 | ItemQuery | The privilege to query Items. |
| 124 | ItemAdd | The privilege to create Items. |
| 125 | ItemSetUserAttr | The privilege to update Item's user-defined attribute values. |
| 126 | ItemSetSysAttr | The privilege to update Item's system-defined attribute values. |
| 127 | ItemDelete | The privilege to delete Items. |
| 128 | ItemMove | The privilege to move Items between Item Types. |
| 129 | ItemLinkTo | The privilege to heterogeneously link Items to other Items (make the Items foreign key children). |
| 130 | ItemLinked | The privilege to set Items to be heterogeneously linked by other Items (make the Items foreign key parents). |
| 131 | ItemOwn | The privilege to set Items to own a collection of Items. |
| 132 | ItemOwned | The privilege to set Items to be owned by other Items. |

Figure 13:
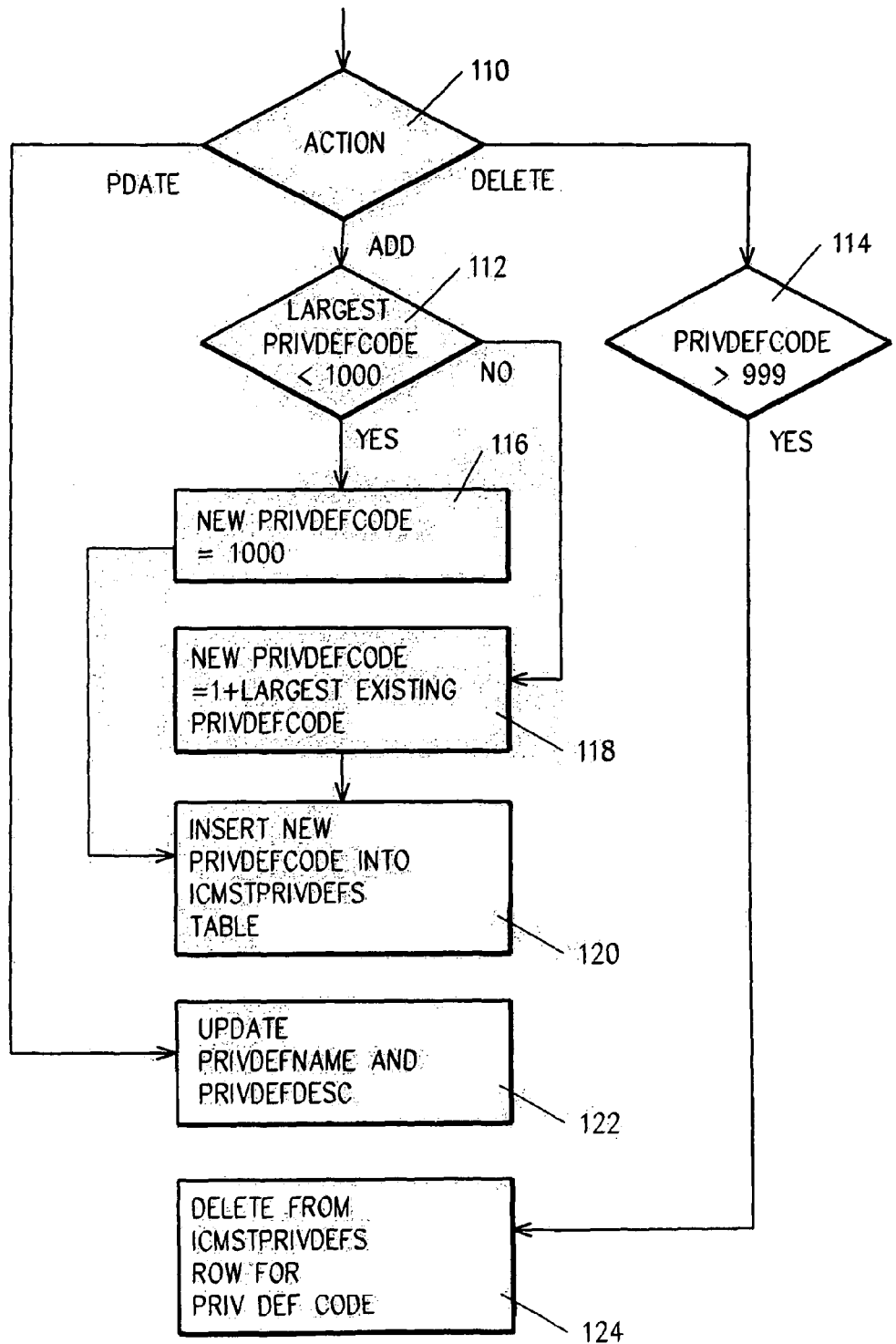
FIG. 13 is a flow diagram illustrating an exemplary embodiment of the method of the invention for managing user defined, application specific privileges in a content management system.

Referring to FIG. 13 in connection with Table VIII, the process of stored procedure 46 which is executed, as is represented by line 50 (FIG. 1), by database server 22 for managing privileges 32 is set forth in flow diagram and pseudo code. As is represented by line 66 (FIG. 1), stored procedure 46 is used to add, update, or delete a single user-defined privilege definition 38 on system database 30, or to update a system defined privilege 34, 36. In step 110 the action is determined. If the action is to add a new privilege, in steps 112, 116 and 118 a new privilege definition code is determined and in step 120 inserted into user defined privileges table 38. If the action is to update, then in step 122 the privilege definition name 74 and privilege definition description 76 are updated. If the action is to delete, in step 114 it is determined that the privilege is a user defined privilege and, if it is, in step 124 the row for the specified privilege definition code is deleted from table 38.

TABLE VIII

STORED PROCEDURE FOR MANAGING PRIVILEGES
(ICMdefine_Privilege)

SQL_API_RC SQL_API_FN ICMdefine_Privilege (
    ICM_SP_PARMS1,
    short *psAction, TABLE VIII-continued STORED PROCEDURE FOR MANAGING PRIVILEGES
(ICMdefine_Privilege)

char *pszLanguageCode,
    char *pszPrivDefName,
    char *pszPrivDefDesc,
    long *plPrivDefCode,
    ICM_SP_PARMS2 )
Parameters:
Action    Action can be ADD, UPDATE or DELETE
LanguageCode    NLS Language Code
PrivDefName    Required for Add, Update. Optional for Delete
PrivDefDesc    Required for Add, Update. Optional for Delete
PrivDefCode    Required for Update and Delete
Action
When the action is ADD,
  If the largest existing PrivDefCode < 1000
    new PrivDefCode = 1000
  else
    new PrivDefCode = largest existing PrivDefCode + 1
  The new PrivDefCode is inserted into ICMSTPRIVDEFS table.
When the action is UPDATE, PrivDef name 74 and description 76 will be updated.
When the action is DELETE, a check is made if the input PrivDefCode 72 is user-definition (>999). On success, the row corresponding to the PrivDefCode 72 is deleted from ICMSTPRIVDEFS table 32.

Figure 14:
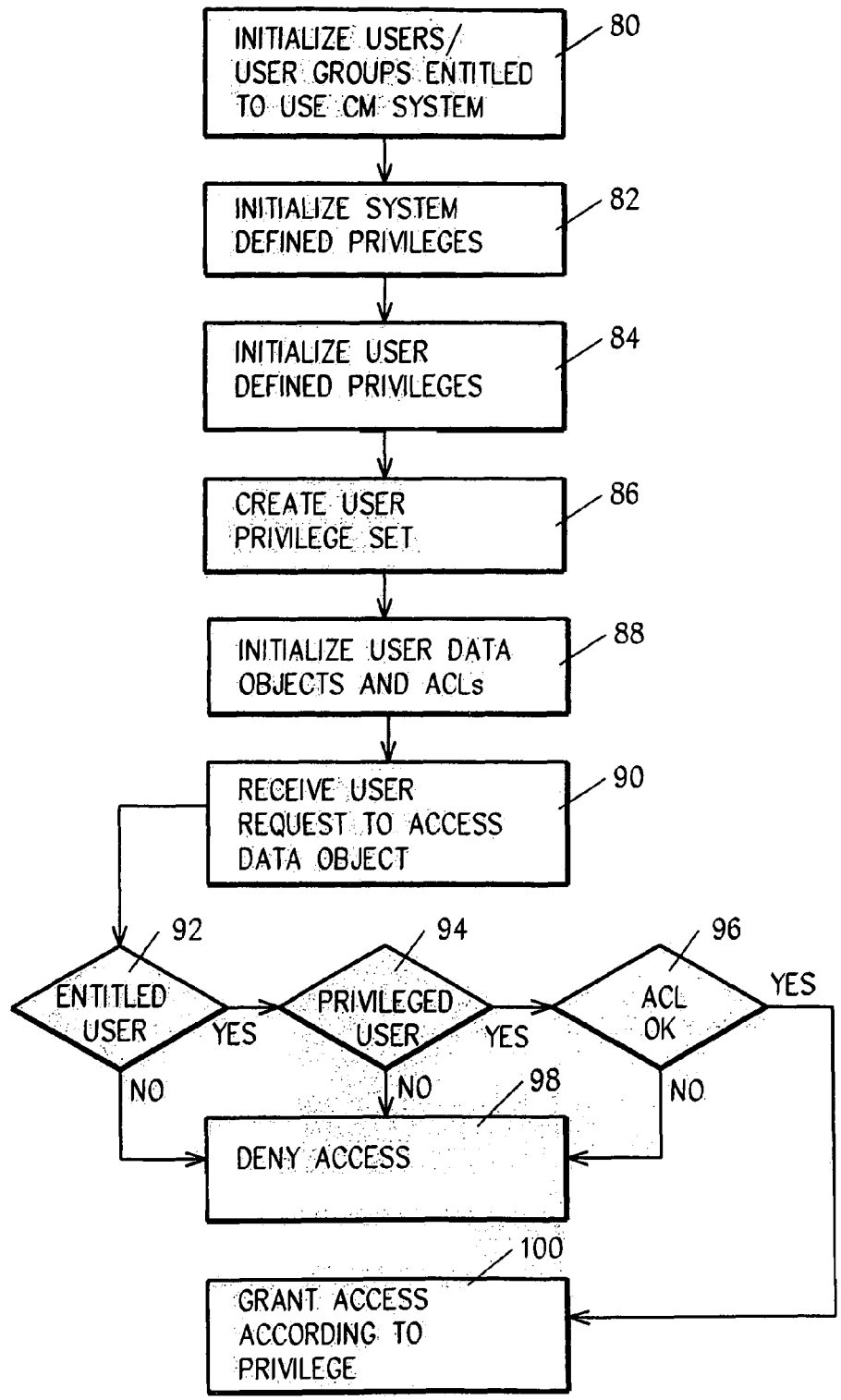
FIG. 14 is a flow diagram illustrating an exemplary embodiment of method of the invention for using user defined, application specific privileges in a content management system.

Referring to FIG. 14, an exemplary embodiment of the invention for using privilege table 32 as part of controlling access to user data items 42 is set forth.

In step 80, users and user groups entitled to use content manager system 20 and the database 30 which it manages are defined by the system administrator.

In step 82, system defined privileges 34, 36 are initialized by the system administrator.

In step 84, user defined privileges 38 have been previously initialized or defined.

In step 86, user defined privileges 38 and system defined privileges 34, 36 are collected into privilege sets.

In step 88, user data objects 42 and access control lists 44 on those objects 42 have been created.

In step 90, content manager system 20 receives a request from a user at client workstation 10 to access a specific user data item 42 for a specific purpose.

In step 92, manager 20 determines if the request is from a user entitled from step 80 to access system 20 and database 30. If not, in step 98 access is denied. If so, then in step 94 the privilege set 48 for this user is accessed to determine if the user is privileged to access data item 42 for the specific purpose identified in step 90. If not, in step 98 access is denied. If so, then in step 96 the access control list 44 for the specific user data item 42 is checked to determine if this user is entitled to access. If not, in step 98 access is denied. If so, in step 100 access is granted according to the privileges of privileges set 48, to read, delete, or update.

Figure 15:
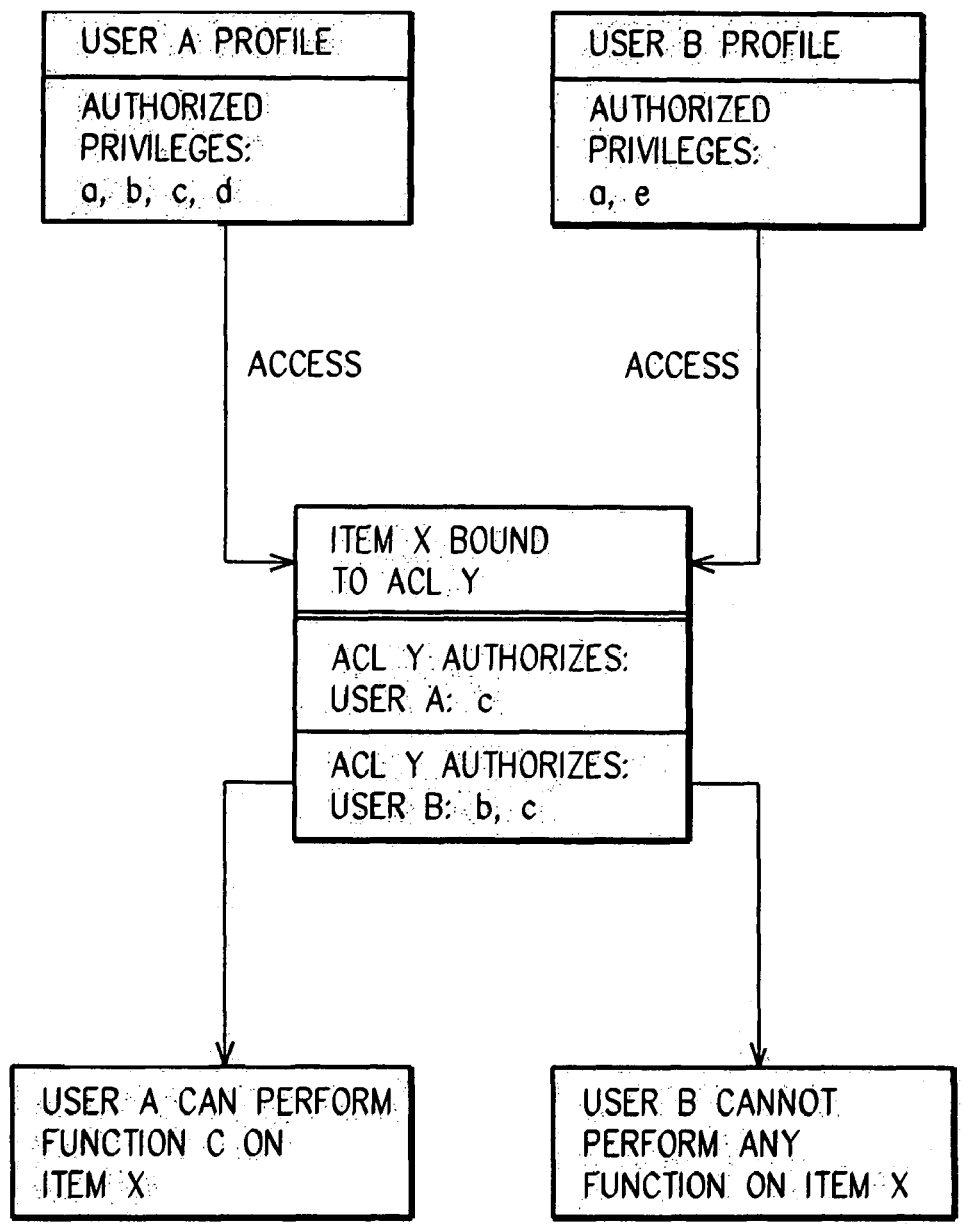
FIG. 15 illustrates user privileges and an access control list for an entity controlled by a content management system.

In accordance with the preferred embodiment of the invention, an access control model is implemented by which one or more rules, associated with a controlled entity, authorizes user operation(s) on the bound entity, i.e., specifies who (users/groups/public) can perform what functions (ACL Privileges) on the controlled entity. An ACL only defines the authorization of the bound entities and does not circumvent the User Privileges. Thus, as is depicted in FIG. 15, in general, to perform an operation on a CM controlled entity, the user needs to pass both his user privileges and the bound ACL checks.

Advantages Over the Prior Art

It is an advantage of the invention that there is provided an improved system and method for managing application specific privileges.

It is a further advantage of the invention that there is provided a system and method for managing application specific privileges at the server side of a client/server system.

It is a further advantage of the invention that there is provided a system and method for defining an unlimited number of application specific privileges.

Alternative Embodiments

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as IBM Systems designated as zSeries, iSeries, xSeries, and pSeries, or the like and pursuant to one or more, or a part of one or more, program elements, modules or objects generated from any programming language, such as C++, Java, PI/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

What is claimed is:

1. Method for managing privileges, comprising:
   storing system defined and user defined privilege definition codes in a database table, with a plurality of said codes reserved to said system defined privilege definition codes, and codes beyond said plurality reserved to said user defined privilege definition codes;
   executing, by operation of one or more computer processors, a database stored procedure for modifying a user defined privilege defined by at least one of the stored user defined privilege definition codes;
   selectively updating: (i) a privilege definition name of the user defined privilege and (ii) a privilege definition description of the user defined privilege, responsive to a user request to update the user defined privilege and via calling the database stored procedure; and
   responsive to a request from a user to access a controlled entity for a specific function, allowing said user to access said controlled entity provided that: (i) a user privilege code established for said user and (ii) a privilege set referenced for said user by an access control list coupled to said controlled entity, both authorize said specific function, wherein said privilege set includes at least one said privilege definition code.

2. The method of claim 1, further comprising:
   responsive to a user request to add a new user defined privilege, determining a new definition code and inserting said new definition code into said database table via calling the database stored procedure.

3. The method of claim 1, further comprising:
   responsive to a user request to delete an existing privilege, deleting from said database table a row containing said user defined privilege code via calling the database stored procedure.

4. System for managing privileges, comprising:
   one or more computer processors;
   a data base table for storing system defined and user defined privilege definition codes, with a plurality of said codes reserved to said system defined privilege definition codes, and codes beyond said plurality reserved to said user defined privilege definition codes;
   a database stored procedure for modifying, by operation of the one or more computer processors, a user defined privilege defined by at least one of the stored user defined privilege definition codes; and
   a content manager for:
   (i) selectively updating: (A) a privilege definition name of the user defined privilege and (B) a privilege definition description of the user defined privilege, responsive to a user request to update the user defined privilege and via calling the database stored procedure; and
   (ii) responsive to a request from a user to access a controlled entity for a specific function, allowing said user to access said controlled entity provided that: (A) a user privilege code established for said user and (B) a privilege set referenced for said user by an access control list coupled to said controlled entity, both authorize said specific function, wherein said privilege set includes at least one said privilege definition code.

5. The system of claim 4, wherein the content manager is further for determining a new definition code and inserting said new definition code into said database table, responsive to a user request to add a new user defined privilege and via calling the database stored procedure.

6. The system of claim 4, wherein the content manager is further for verifying that an existing privilege includes a user defined privilege code and deleting from the database table a row containing the user defined privilege code, responsive to a user request to delete the existing privilege and via calling the database stored procedure.

7. A computer-readable storage medium containing a program which, when executed by a computer processor, performs an operation for managing privileges, comprising:

storing system defined and user defined privilege definition codes in a database table, with a first plurality of said codes reserved to said system defined privilege definition codes, and codes beyond said first plurality reserved to said user defined privilege definition codes;

executing a database stored procedure for modifying a user defined privilege defined by at least one of the stored user defined privilege definition codes;

selectively updating: (i) a privilege definition name of the user defined privilege and (ii) a privilege definition description of the user defined privilege, responsive to a user request to update the user defined privilege and via calling the database stored procedure; and responsive to a request from a user to access a controlled entity for a specific function, allowing said user to access said controlled entity provided that: (i) a user privilege code established for said user and (ii) a privilege set referenced for said user by an access control list coupled to said controlled entity, both authorize said specific function, wherein said privilege set includes at least one said privilege definition code.

8. The computer readable storage medium of claim 7, said operation further comprising:

responsive to a user request to add a new user defined privilege, determining a new definition code and inserting said new definition code into said database table via calling the database stored procedure.

9. The computer readable storage medium of claim 7, said operation further comprising:

responsive to a user request to delete an existing privilege, verifying that said existing privilege includes a user defined privilege code and deleting from said database table a row containing said user defined privilege code via calling the database stored procedure.

* * * * *